United States Patent [19]

Apple, Jr.

[11] 3,771,126

[45] Nov. 6, 1973

[54] ERROR CORRECTION FOR SELF-SYNCHRONIZED SCRAMBLERS

[75] Inventor: Garrett Gordon Apple, Jr., Marlboro, N.J.

[73] Assignee: Bell Telephone Laboratories Incorporated, Murray Hll, N.J.

[22] Filed: Apr. 10, 1972

[21] Appl. No.: 242,438

[52] U.S. Cl. ........................................ 340/146.1 AL
[51] Int. Cl. ............................................ G06f 11/12
[58] Field of Search ............... 340/146.1 AL, 172.5; 325/41

[56] References Cited

UNITED STATES PATENTS

| | | | |
|---|---|---|---|
| 3,278,729 | 10/1966 | Chien | 340/146.1 AL |
| 3,418,629 | 12/1968 | Chien | 340/146.1 AL |
| 3,423,729 | 1/1969 | Heller | 340/146.1 AL |
| 3,649,915 | 3/1972 | Mildonian | 325/41 |

OTHER PUBLICATIONS

E. R. Berlekamp, Algebraic Coding Theory, McGraw-Hill Book Co., 1968, pp. 132–145.

*Primary Examiner*—Charles E. Atkinson
*Attorney*—W. L. Keefauver

[57] ABSTRACT

Block codes are scrambled for transmission through a high speed digital channel, which enhances the transmission characteristics of the signal, but errors in the scrambled signal introduced by noise in a transmission channel are multiplied into error patterns when the transmitted signal is descrambled to recover the originally encoded signal. The invention produces a syndrome that is used to locate the random errors introduced by the channel noise. Conventional apparatus locate the random channel errors and produce correction signals. The correction signals are used to reproduce the error patterns for the correction of the descrambled signal. Embodiments are disclosed which correct error multiplication produced by a one-cell scrambler in a digital transmission system.

7 Claims, 7 Drawing Figures

TRANSMISSION SYSTEM 111

SCRAMBLER CIRCUIT 211

TIME →

| A | B | C | D | E | F |
|---|---|---|---|---|---|
| 1 | 1 | 0 | 1 | 1 | 0 |
| 0 | 1 | 0 | 1 | 0 | 0 |
| 1 | 0 | 0 | 0 | 1 | 0 |
| 1 | 1 | 0 | 1 | 1 | 0 |
| 0 | 1 | 0 | 1 | 0 | 0 |
| 1 | 0 | 0 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |

TIME →

| A | B | C | D | E | F |
|---|---|---|---|---|---|
| 1 | 1 | 0 | 1 | 1 | 0 |
| 0 | 1 | 1 | 0 | 1 | 1 |
| 1 | 0 | 0 | 0 | 0 | 1 |
| 1 | 1 | 0 | 1 | 0 | 0 |
| 0 | 1 | 0 | 1 | 0 | 0 |
| 1 | 0 | 0 | 0 | 0 | 0 |
| 0 | 0 | 1 | 1 | 1 | 1 |
| 0 | 0 | 0 | 0 | 1 | 1 |
| 0 | 0 | 0 | 0 | 0 | 0 |

FIG. 5

LOG AND ANTILOG TABLES FOR $\alpha$ WHERE $\alpha^4 + \alpha + 1 = 0$

| EXP. | $\alpha^3$ | $\alpha^2$ | $\alpha$ | 1 |
|---|---|---|---|---|
| 0 | 0 | 0 | 0 | 1 |
| 1 | 0 | 0 | 1 | 0 |
| 2 | 0 | 1 | 0 | 0 |
| 3 | 1 | 0 | 0 | 0 |
| 4 | 0 | 0 | 1 | 1 |
| 5 | 0 | 1 | 1 | 0 |
| 6 | 1 | 1 | 0 | 0 |
| 7 | 1 | 0 | 1 | 1 |
| 8 | 0 | 1 | 0 | 1 |
| 9 | 1 | 0 | 1 | 0 |
| 10 | 0 | 1 | 1 | 1 |
| 11 | 1 | 1 | 1 | 0 |
| 12 | 1 | 1 | 1 | 1 |
| 13 | 1 | 1 | 0 | 1 |
| 14 | 1 | 0 | 0 | 1 |

| $\alpha^3$ | $\alpha^2$ | $\alpha$ | 1 | EXP. |
|---|---|---|---|---|
| 0 | 0 | 0 | 1 | 0 |
| 0 | 0 | 1 | 0 | 1 |
| 0 | 0 | 1 | 1 | 4 |
| 0 | 1 | 0 | 0 | 2 |
| 0 | 1 | 0 | 1 | 8 |
| 0 | 1 | 1 | 0 | 5 |
| 0 | 1 | 1 | 1 | 10 |
| 1 | 0 | 0 | 0 | 3 |
| 1 | 0 | 0 | 1 | 14 |
| 1 | 0 | 1 | 0 | 9 |
| 1 | 0 | 1 | 1 | 7 |
| 1 | 1 | 0 | 0 | 6 |
| 1 | 1 | 0 | 1 | 13 |
| 1 | 1 | 1 | 0 | 11 |
| 1 | 1 | 1 | 1 | 12 |

ERROR CORRECTION FOR SELF-SYNCHRONIZED SCRAMBLERS

BACKGROUND OF THE INVENTION

This invention relates to data processing and transmission systems and, more particularly to error detection and correction in such systems.

The need for controlling and limiting digital errors in the transmission and processing of digital data has long been recognized. Usually, such digital data is represented by sequences of binary signals (referred to as bits), wherein each sequence (or data word) comprises a fixed number of bits. Information messages are then represented by different combinations of data words just as combinations of symbols of the alphabet represent words. In block codes, a sequence of words is transmitted in a group (or block).

Various methods have been developed for improving the accuracy of transmission and processing data words. For example, one method involves encoding the data words into code words (of certain predetermined codes) which contain not only the original data words but additional or redundant information (parity bits). These code words may then be processed in certain prescribed ways to determine whether any errors have occurred in the code words and the positions of these errors.

Codes have been devised for correcting random errors (errors occurring randomly throughout the transmitted data), burst errors (errors occurring in "bunches") or both random and burst errors. One of the best known and most commonly used class of codes for correcting random errors is the so-called class of Bose-Chaudhuri-Hocquenghem (BCH) codes. Consequently, the present invention is designed primarily to operate with BCH codes although it is not restricted to this class of codes.

For transmission of data through a digital transmission system, the code is often altered to provide desirable characteristics for transmission. For example, scramblers are used to make the bit pattern random before transmission through a channel. Scramblers are used, for example, to reduce the probability of a high energy concentration at one frequency in the frequency bandwidth of a digital channel which will cause cross talk between adjacent channels. At the receiver, a descrambler converts the random signal back into the original code. Unfortunately, noise introduced by transmission of the signal through the channel produces random errors which are multipled by the descrambler. Furthermore, these errors occur in a pattern or burst determined by the structure of the descrambler. Both random and burst error correction arrangements available to those working in the art cannot reliably correct error patterns which are produced by the multiplication of random errors. It would be highly desirable to have a method and arrangement which efficiently corrects random errors that are unavoidably multipled to produce a known pattern.

SUMMARY OF THE INVENTION

In a method of the invention, a syndrome is calculated by operating on a descrambled sequence of information signals which contain error patterns that are caused by random errors. The syndrome contains information which locates the random errors. The syndrome is generated by the multiplication of remainders $$r_i(x) = \sum_{j=0}^{m-1} r_{ij}x^j$$

by the $m$ by $m$ matrices $C_i^{(cr)}$ $i = 1, 3, — 2t-1$. The $C_i^{(cr)}$ matrix is obtained by the matrix products of $F_iC_i'^{(cr)}$. The matrices $$F_i(i = 1, 3, — 2t-1)$$

are linear transforms determined by the multiplication of $$[1/f'(\alpha^i)]\ i = 1, 3, — 2t-1 \text{ by } C_i'^{(cr)}.$$

The $C_i'^{(cr)}$ is the connection matrix for the unscrambled information sequence with the columns reversed.

In a first illustrative embodiment of the invention, information sequences which contain random errors that cause predetermined error patterns are divided by the feedback polynomials $$g_1(x) = x^4 + x + 1$$

and $$g_3(x) = x^4 + x^3 + x^2 + x + 1$$

of two shift registers to obtain respectively, remainders $r_1(x)$ and $r_3(x)$. Connection matrices linearly transform $r_1(x)$ and $r_3(x)$ into respective syndrome components $S_1$ and $S_3$. An error polynomial calculator and a Chien searcher derive correction signals from the syndrome components $S_1$ and $S_3$ for the random errors. An arrangement of modulo 2 adders and delay circuits combine the correction signals with the information sequences such that the error patterns are eliminated to produce an information sequence free of errors.

In a second illustrative embodiment of the invention, information sequences are applied to a parity checker. For each information sequence that has even parity, the components of the second illustrative embodiment which include all of the components of the first illustrative embodiment operate the same to correct any error patterns present in the information sequence. For each sequence that has odd parity, the presence of an error overlap pattern between two information sequences is indicated. Thus, the first bit of the information sequence is inverted and the syndrome components $S_1$ and $S_3$ are modified. The correction signals of the Chien searcher are applied to the information sequences by an arrangement of switches, modulo 2 adders, and delay to eliminate the error overlap pattern from the information sequence.

A feature of the invention is the connection matrix and the arrangement for the correction signals which enable conventional random error apparatus to be used to correct the predetermined error patterns caused by the passage of random errors through a descrambler.

These and other features will become apparent upon reading the detailed description in conjunction with the accompanying drawings.

BRIEF DESCRIPTION OF THE DRAWINGS

FIG. 5 is two tables for the log and anti-log values of $\alpha$ which are useful for a discussion of the operation of circuit depicted by FIG. 3.

DETAILED DESCRIPTION

Figure 1:
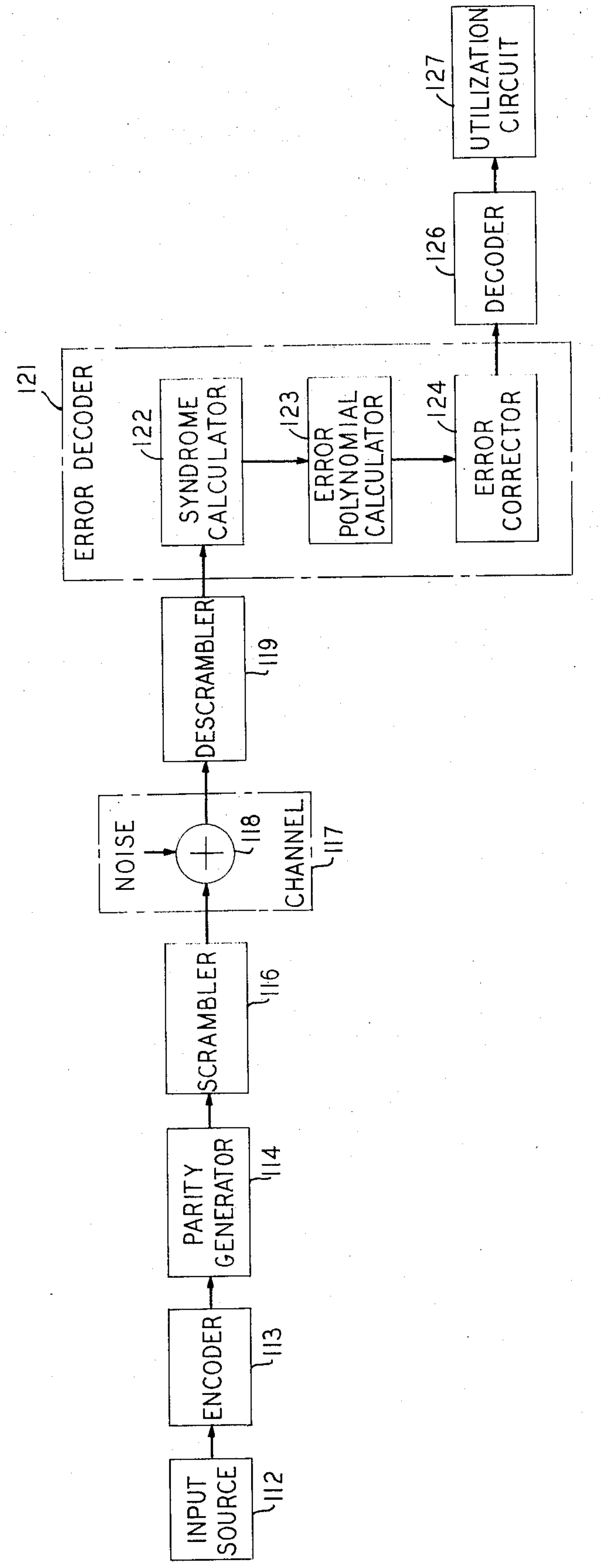
FIG. 1 is a diagram of a transmission system embodying the features of the invention.

Before discussing the method and apparatus of the present invention, a general description of BCH codes will first be given. A BCH code of length $n = 2^m - 1$ can, with at most $mt$ check bits, correct any set of $t$ independent errors (or alternatively detect any set of $2t$ errors) with a block of $n$ bits. The integers $m$ and $t$ are arbitrary positive integers.

A t-error-correcting BCH code may be described as the set of all polynomials $(c(x))$ over the Galois Field GF(2) of degree $n-1$ or less, such that $$c(\alpha^i) = 0 \quad i = 1, 3, 5, \ldots, 2t-1$$

where $\alpha$ is a primitive element of the finite field GF($2^m$), $$c(x) = c_0 = c_1 + x + c_2 x^2 + \ldots + c_{n-1} x^{n-1},$$

and $c_j = 0, 1$ ($j = 0, 1, 2, \ldots, n-1$). In other words, $c(x)$ is a code word of the BCH code if and only if $c(\alpha^i) = 0$. These polynomials or code words consist of all the multiples of the polynomial $g(x)$ known as the generator polynomial of the code. $g(x)$ is the polynomial of least degree which satisfies the equations $g(\alpha^i) = 0$, $i = 1, 3, 5, \ldots, 2t-1$.

A code word which has been transmitted over a communication channel may be represented by $$r'(x) = c(x) + e(x)$$

where $e(x)$ represents the error pattern word (i.e., the errors which occurred in the transmitted code word $c(x)$). If the field elements $\alpha^i$ are substituted in $r'(x)$, the following is obtained:

$$r'(\alpha^i) = c(\alpha^i) + e(\alpha^i) = S_i \quad i = 1, 3, \ldots, 2t-1.$$

The functions $S_i$ are known as the power sum symmetric functions. These functions can be utilized to determine the location of errors in the transmitted data sequences. Peterson, W. W., *Error Correction Codes*, MIT Press, 1961, (Peterson text) pp. 162–182; Chien, R. T., "Cyclic Decoding Procedures for Bose-Chaudhuri-Hocquenghem Codes", *I.E.E.E. Transactions on Information Theory*, October, 1964, pp. 357–363, and Berlekamp, E. R., *Algebraic Coding Theory*, McGraw-Hill Book Company, 1968, (Berlekamp text) p. 194 et seq. are references which discuss the general decoding characterixtics of BCH codes.

The present invention involves a method of determining the power sum symmetric functions of the channel error locations and correcting the fixed burst patterns produced by the descrambler.

The following discussion explains the effect of a descrambler on the power sum symmetric functions and how the original error locations may be recovered. The scrambler and decrambler input and output sequences are represented by polynomials in $x$ in which the exponent of $x$ increases with time. If $e(x)$ represents the polynomial for the channel error sequence, then the error sequence at the output of the descrambler will be given by the product $e(x)f(x)$ where $f(x)$ is a polynomial indicative of the feedback path in the descrambler shift register. The error polynomials can be reduced modulo $x^n - 1$ in order to obtain an error sequence with cyclic symmetry and length $n$. Code words are usually represented by polynomials which are transmitted highest order term first. This allows division of polynomials to be performed in real time. Therefore in order to proceed with the algebra it is necessary to replace the polynomial $f(x)$ with $f'(x) = f(x^{-1}) = x^{-k} f^*(x)$ is the reciprocal polynomial of $f(x)$ (Peterson text, p. 106) and $k$ is the degree of $f(x)$. $f(x)$ is a translated or shifted version of $f^*(x)$.

Theorem 1:

A sufficient condition that the full error correcting capability of the code can be used is that $f^*(\alpha^i) \neq 0$; $i = 1, 3, 5, \ldots, 2t-1$ where $\alpha^i$; $i = 1, 3, \ldots 2t-1$ are the roots of the code generator $g(x)$.

Corollary:

A sufficient condition that the full error correcting capability of the code can be used is that $f^*(x)$ and $g(x)$ be relatively prime.

Proof:

The received syndrome is given by: $S_i' = e_s(\alpha^{-i}) - e(\alpha^{-i}) f(\alpha^{-i}) = e^*(\alpha^i) f'(\alpha^i) = e^*(\alpha^i)\, \alpha^{-ik} f^*(\alpha^i)$ $i = 1, 3, \ldots, 2t-1$ where $\alpha^{-i}$ is used instead of $\alpha^i$ due to the reversal of the polynomials. The syndrome (power sum symmetric functions) of the actual channel errors is given by $S_i = e(\alpha^{-i}) = e^*(\alpha^i)$ $i = 1, 3, \ldots, 2t-1$. In order to determine $S_i$ from $S_i'$ it is sufficient that $f^*(\alpha^i) \neq 0$ $i = 1, 3, \ldots, 2t-1$.

Q.E.D.

To determine the syndrome of the channel errors, it is necessary to calculate the syndrome of the received polynomial in the usual manner (Berlekamptext) pp. 119–129 and then multiply each part by $S_i'$ by $1/f'(\alpha^i)$ $i = 1, 3, \ldots, 2t-1$, respectively. Each component $S_i$ of the syndrome is normally calculated by dividing the received polynomial by $g_i(x)$, the minimum polynomial of $\alpha^i$ to obtain a remainder $r_i(x)$. $r_i(\alpha^i)$ is normally calculated from $r_i(x)$ by means of a linear transformation which is implemented by a connection matrix and a set of modulo 2 adders (Berlekamp text, p. 45).

Since multiplication by a constant $1/f'(\alpha^i)$ is a linear operation, this multiplication can be implemented by a combination of the two linear transformations which is achieved by a change in the connection matrix. After the channel error locations have been determined by the error polynomial calculator and located by an error corrector, the correction sequence must be run through a descrambler (or an equivalent circuit) and subtracted (same as "added" in binary) from the stored code word.

In most cases where scramblers are used, the length of the scrambler shift register is relatively short. If error correcting codes are used it is not unreasonable to assume that the scrambler burst is shorter than a code word. Therefore, one scrambler burst cannot extend over more than two adjacent code words. For example, one application may be a code with a block length of 1023 bits and a one cell scrambler. In this case, an overlap error pattern which bridges or overlaps two successive code words occurs for only 0.1 percent of the errrors. Even if a ten bit scrambler is used, the error overlap occurs only for one percent of the errors. It is possible, under these circumstances, to ignore the error overlap problem unless the requirements are stringent enough to warrant further complexity in the decoder.

Since the one cell scrambler is probably one of the most commonly used scramblers, the characteristics of the one cell scrambler will be considered. The feedback polynomial of the one cell scrambler is represented by the polynomial $f(x) = x + 1$. This polynomial is self reciprocal. For reasons which will be specified, it may be desirable to use a code generator polynomial which has 1 as a root; i.e., $x + 1$ is a factor of $g(x)$. Since $f(1) = 0$, the conditions of Theorem 1 are not met. However, it is possible to state a much stronger theorem for binary one cell scramblers than Theorem 1.

Theorem 2:

For a binary $t$-error correcting cyclic code with generator $g(x)$ and a scrambler with feedback polynomial $f(x) = x + 1$ the code can correct $t$ scrambler bursts if:

1. $x + 1$ is not a factor of $g(x)$ or
2. the augmented code generated by $g(x)/(x+1)$ is t-error correcting and $x + 1$ is not a factor of $g(x)/(x+1)$.

Proof: (Note that a consideration of a set of cyclic error patterns does not include error overlaps which are not cyclic).

Part 1 is a direct consequence of the corollary of Theorem 1. To prove Part 2 of Theorem 2, note that if $g(x)$ is divisible by $x + 1$ then 1 is a root of the generator polynomial and one row of the parity check matrix contains all ones. If this row is removed from the parity check matrix the result is the parity check matrix of the augmented code generated by $g(x)/(x+1)$. Since the augmented code is $t$-error correcting and its generator is not divisible by $x + 1$, part one of this theorem applies to the augmented code. The desired code is a subcode of the augmented code. Therefore, its correctable error patterns include those of the augmented code. Q.E.D.

Part 2 of Theorem 1 is not overly restrictive. For most cases of interest, the code generator is either not divisible by $x + 1$ or else the generator is obtained by expurgating a code whose generator is not divisible by $x + 1$. The latter is specifically used in the consideration of error pattern overlaps.

A general connection matrix will be derived first which includes a general polynomial for the descrambler. This will be followed by the derivation of the specific connection matrix for an example which utilizes the one cell scrambler.

The syndrome components $S_1, S_3, \ldots, S_{2t-1}$ are determined from the remainders $r_1(x), r_3(x), \ldots r_{2t-1}(x)$, respectively. If the syndrome were evaluated without regard to the scrambler, then $S_i' = r_i(\alpha^i)$ $i = 1, 3, \ldots, 2t-1$. All elements of $GF(2^m)$ may be represented in terms of a set of basis elements $(1, \alpha, \alpha^2, \ldots \alpha^{m-1})$. Let $$r_i(x) = \sum_{j=0}^{m-1} r_{ij} x^j \text{ and let } \alpha^j = \sum_{l=0}^{m-1} a_{jl}\alpha^l.$$

$$\text{Then } r_i(\alpha^i) = \sum_{j=0}^{m-1} r_{ij}\alpha^{ij} = \sum_{j=0}^{m-1} r_{ij} \sum_{l=0}^{m-1} a_{(ij)l}\alpha^l$$

$$= \sum_{l=0}^{m-1} \left[ \sum_{j=0}^{m-1} r_{ij} a_{(ij)l} \right] \alpha^l.$$

This can be written by matrices as $$\begin{bmatrix} a_{(i(m-1))(m-1)} & \cdots & a_{0(m-1)} \\ a_{(i(m-1))(m-2)} & \cdots & a_{0(m-2)} \\ \cdot & & \\ \cdot & & \\ a_{(i(m-1))0} & \cdots & a_{00} \end{bmatrix} \begin{bmatrix} r_{i(m-1)} \\ \cdot \\ \cdot \\ r_{i1} \\ r_{i0} \end{bmatrix} = C_i'^{(cr)} R_i$$

where the super script $(cr)$ denotes that the columns are reversed from what will be needed later. The matrices $C_i'$ would be the necessary connection matrices if the scrambler were not considered.

The effect of the scrambler must now be considered. From the part of the derivation following Theorem 1, it is seen that the desired syndrome components $S_i$ are expressed by $$S_i = [1/f(\alpha^i)]\, r_i(\alpha^i).$$

Since multiplication by a constant in any field is a linear operation, the foregoing expression in terms of basis elements results in multiplication by a matrix (for $[1/f(\alpha^i)]$ as follows:

$$F_i = \begin{bmatrix} f^{(i)}_{(m-1)(m-1)} & \cdots & f^{(i)}_{(m-1)0} \\ f^{(i)}_{(m-2)(m-1)} & \cdots & f^{(i)}_{(m-2)0} \\ \cdot & & \\ \cdot & & \\ \cdot & & \\ f^{(i)}_{0(m-1)} & \cdots & f^{(i)}_{00} \end{bmatrix}$$

The first column is determined by the m-component vector representation (with respect to the given basis) of the product of $[1/f(\alpha^i)]$ with $\alpha^{m-1}$. The second column is given by the product of $[1/f(\alpha^i)]$ with $\alpha^{m-2}$, etc. The last column is $[1/f(\alpha^i)]$.

The desired connection matrices considering the scrambler are then given by $C_i$ where $$C_i^{(cr)} = F_i\, C_i'^{(cr)}.$$

$C_i^{(cr)}$ is the matrix of the entire transformation of evaluating $r_i(x)$ at $\alpha^i$ and then multiplying by $[1/f(\alpha^i)]$.

For the particular example considered in FIG. 2, the matrices listed on page 127 of the Berlekamp text are shown.

It should be understood that everywhere the element $\alpha$ and the set $(1, 3, \ldots 2t-1)$ are used in the mathematical notation, $\alpha$ is considered a primitive element of the field $GF(2^m)$ and the set $(1, 3, \ldots 2t-1)$ can be replaced by any subset of the set of all integers. This is all that is necessary in the mathematical result to apply it to any linear cyclic code.

From the derivation of the general connection matrix, a determination of a connection matrix with the one cell scrambler applied to a (15,7) BCH code, is as follows:

The (15,7) BCH code is for double-error-correction (Berlekamp text, p. 125). Let $\alpha$ be a primitive element of $GF(2^4)$ with minimum polynomial $x^4 + x + 1$. The powers of $\alpha$ determine all nonzero elements of $GF(2^4)$. Since $GF(2^4)$ is an extension field of $GF(2)$, $GF(2^4)$ can be represented as a vector space over $GF(2)$ with basis elements $1, \alpha, \alpha^2, \alpha^3$. With this notation, the binary representation of all powers of $\alpha$ are given in the log and antilog tables of FIG. 5. One way to construct a double error correcting code is to use a generator polynomial which has $\alpha$ and $\alpha^3$ as roots (Peterson text, p. 162 or Berlekamp text, p. 128). The minimal polynomial of $\alpha^3$ is $x^4 + x^2 + x + 1$ and the desired generator polynomial is $$g(x) - x^8 + x^7 + x^6 + x^4 + 1 .$$

The parity check matrix for this code is given by $$H=\begin{bmatrix}\alpha^{14}\alpha^{13}\alpha^{12}\alpha^{11}\alpha^{10}\alpha^{9}\alpha^{8}\alpha^{7}\alpha^{6}\alpha^{5}\alpha^{4}\alpha^{3}\alpha^{2}\alpha 1\\ \alpha^{12}\alpha^{9}\alpha^{6}\alpha^{3}1\alpha^{12}\alpha^{9}\alpha^{6}\alpha^{3}1\alpha^{12}\alpha^{9}\alpha^{6}\alpha^{3}1\end{bmatrix}$$

The binary values can be substituted from FIG. 5. With the technique discussed previously, it can be determined that $1/f'(\alpha)=\alpha^{12}$ and $1/f'(\alpha^3)=\alpha^4$.

The specific connection matrices for the one cell scrambler are determined as follows:

$$C_1'^{(cr)}=\begin{bmatrix}1&0&0&0\\0&1&0&0\\0&0&1&0\\0&0&0&1\end{bmatrix}\quad C_3'^{(cr)}=\begin{bmatrix}1&1&1&0\\0&1&0&0\\1&0&0&0\\0&0&0&1\end{bmatrix}$$

The matrices $F_1$ and $F_3$ can be computed as follows:

$$F_1=\alpha^{12}\ (\ \alpha^3\ \alpha^2\ \alpha\ 1)$$
$$=(\ \alpha^{12}\alpha^3\ \alpha^{12}\alpha^2\ \alpha^{12}\alpha\ \alpha^{12}\ 1)$$
$$=(\ \alpha^{15}\ \alpha^{14}\ \alpha^{13}\ \alpha^{12}\ )$$
$$=\begin{bmatrix}0&1&1&1\\0&0&1&1\\0&0&0&1\\1&1&1&1\end{bmatrix}$$

$$F_2=\alpha_4(\alpha^3\ \alpha^2\ \alpha\ 1)$$
$$=(\alpha^7\ \alpha^6\ \alpha^5\ \alpha^4\ )$$
$$=\begin{bmatrix}1&1&0&0\\0&1&1&0\\1&0&1&1\\1&0&0&1\end{bmatrix}$$

Carrying out the matrix multiplications:

$$C_1^{(cr)}=F_1C_1'^{(cr)}=\begin{bmatrix}0&1&1&1\\0&0&1&1\\0&0&0&1\\1&1&1&1\end{bmatrix}$$

$$C_3^{(cr)}=F_3C_3'^{(cr)}=\begin{bmatrix}1&0&1&0\\1&1&0&0\\0&1&1&1\\1&1&1&1\end{bmatrix}$$

Figure 3:
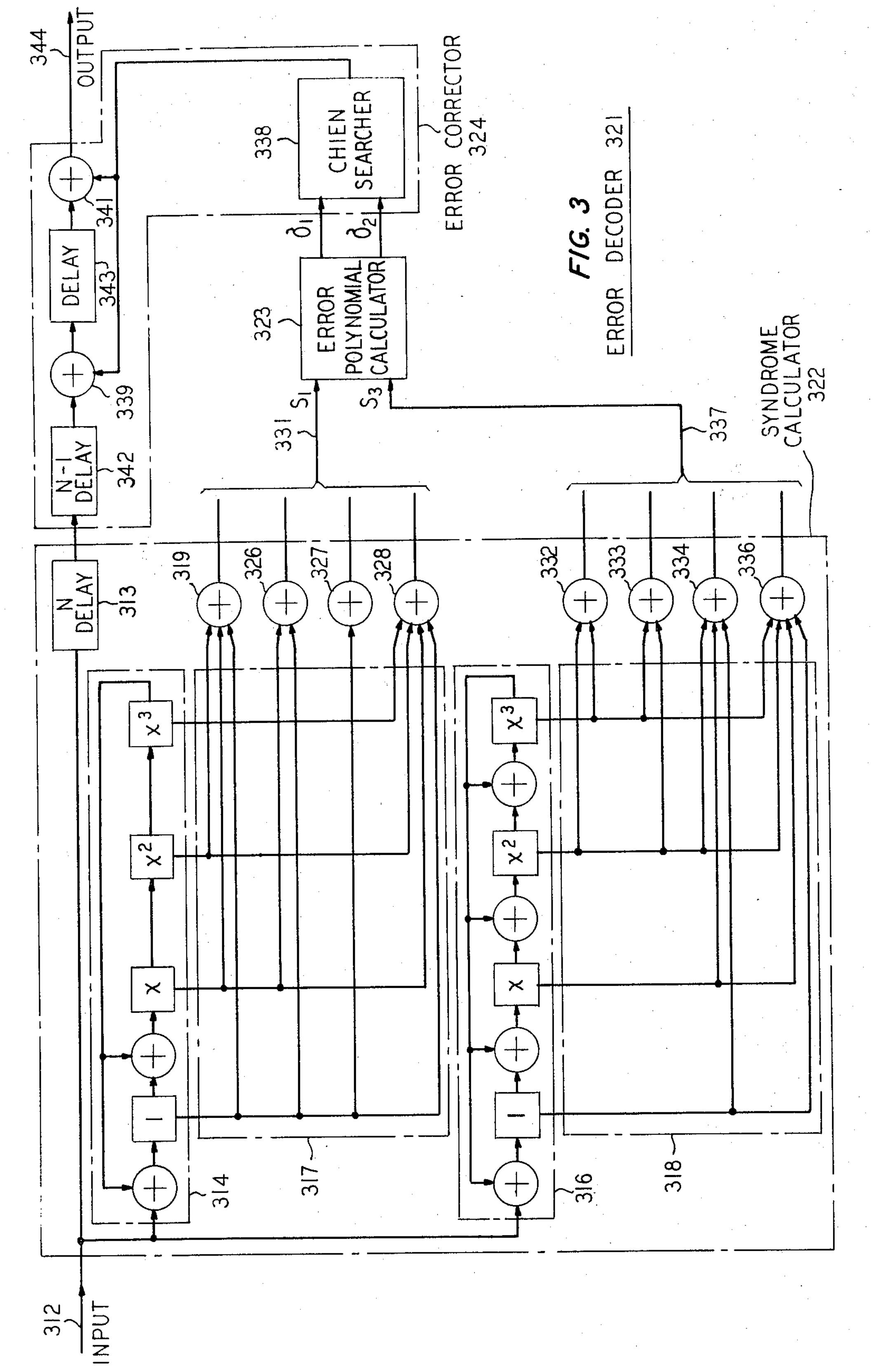
FIG. 3 is an error decoder which can be utilized in FIG. 1.

Connection matrices 317 and 318 of FIG. 3 are the hardward realization of $C_1$ and $C_3$.

Decoding from this point proceeds in the same manner as for random errors. The error locator polynomial is given by the Berlekamp text, page 139, as $$\sigma(z)=1\ S_1z+(S_1^2+[S_3/S_1])\ z^2$$

The error calculator determines $\sigma_1=S_1$ and $\sigma_2=S_1{}^2+(S_3/S_1)$. The error corrector determines the reciprocal roots of the error locator polynomial by means of a Chien search (Berlekamp text, page 132). However, whenever the Chien search indicates an error correction, two adjacent positions must be inverted in the received vector instead of the usual single position. A circuit which implements the desired corrections is depicted by FIG. 3. This completes the necessary modification of the decoder in order to correct scrambler burst patterns instead of independent errors.

The problem of overlap will now be considered. If a scrambler burst extends past one end of a code word into another code word, then the resulting error patterns in each code word may not be correctable. This is an error overlap pattern which bridges two successive code words. In the case of the one cell scrambler where $f(x)=x+1$, the error overlap patterns (100 . . .00) and (000 . . .01) are not correctable although the pattern (100 . . .01) is correctable. The latter is an error overlap which occurs on both ends of a code word. Due to the cyclic nature of the code, the error pattern is correctable within that code word. Therefore, only single overlaps require consideration. If all the code words have even weight and all correctable error patterns have even weight while the error overlap patterns produce an odd weight, it is possible to detect a single overlap with an overall parity check. Such a parity check is realized by appending a row of all ones onto the parity check matrix. The generator polynomial is obtained by expurgating the original code through the multiplication of the generator polynomial $g(x)$ by $x+1$. Then the generator of the expurgated code is $g'(x)=(x+1)\,g(x)$. Since 1 is a root of $g'(x)$ and $g'(x)$ contains all the other roots of $g(x)$, the parity check matrix is obtained by augmenting the parity check matrix H with a row of all ones. Thus, the parity check matrix is:

$$H'=\begin{bmatrix}H\\ \hline 1\ 1\ 1\ .\ .\ .\ 1 1\end{bmatrix}.$$

If an error overlap occurs then the last term of the syndrome is 1. Implementation of this overall parity check can be accomplished with a single flip-flop and an "exclusive or" circuit.

The only problem with the detection method is that it is not known on which end the overlap occurred. What can be done is to invert one bit (not an entire burst) on a particular end of the code word before any other decoding is attempted. Two possibilities can occur. If the error is actually on the end which is to be inverted, then the error is removed and decoding can proceed for bursts elsewhere in the code word. If the error is on the other end of the code word, then the inversion causes the pattern (100 . . .01) to occur. Since this is a correctable error pattern, it is possible to remove it by subsequent decoding. In either case an error overlap within one code word is corrected. The other part of the error overlap will be corrected by the adjacent code word.

The method of correcting overlaps is as follows: The entire syndrome is calculated, which includes the overall parity check. If the overall parity check indicates an overlap then an end bit, for example, the first bit, of the stored code word is inverted and the syndrome is modified accordingly.

In the following discussion it is assumed that an overlap has occurred and that the term "syndrome" refers to the results of the parity calculations other than the overall parity check.

The first column of the parity check matrix is $$A^T=[\alpha^{(n-1)}\ \alpha^{3(n-1)}\ .\ .\ .\ \alpha^{(2t-1)(n-1)}]^T.$$

When a 1 is added to the first position of the code word, the syndrome must be adjusted accordingly by the addition of the transformed version of A. Decoding can then proceed in the usual manner. The added vector is $$[[1/f'(\alpha)]\ \alpha^{n-1}\ [1/f'(\alpha^3)]\ \alpha^{3(n-1)}\ .\ .\ .\ [1/f'(\alpha^{2t-1})]\ \alpha^{(2t-1)(n-1)}].$$

The foregoing procedure may now be applied to the (15,7) double-error-correcting BCH code. The generator for the expurgated code is $$g'(x) = x^9 + x^6 + x^5 + x^4 + x + 1.$$

The vector A for the (15,7) BCH code is given by $$A^T = [\alpha^{14}\ \alpha^{12}\ ].$$

The term which must be added to the syndrome is $$\begin{bmatrix} \alpha^{12} & \alpha^{14} \\ \alpha^4 & \alpha^{12} \end{bmatrix} = \begin{bmatrix} \alpha^{26} \\ \alpha^{16} \end{bmatrix} = \begin{bmatrix} \alpha^{11} \\ \alpha \end{bmatrix} = [1110\ 0010]^T$$

This completes the modifications to the syndrome calculator which are necessary in order to correct error overlaps for the scrambler polynomial $f(x) = x + 1$.

Figure 4:
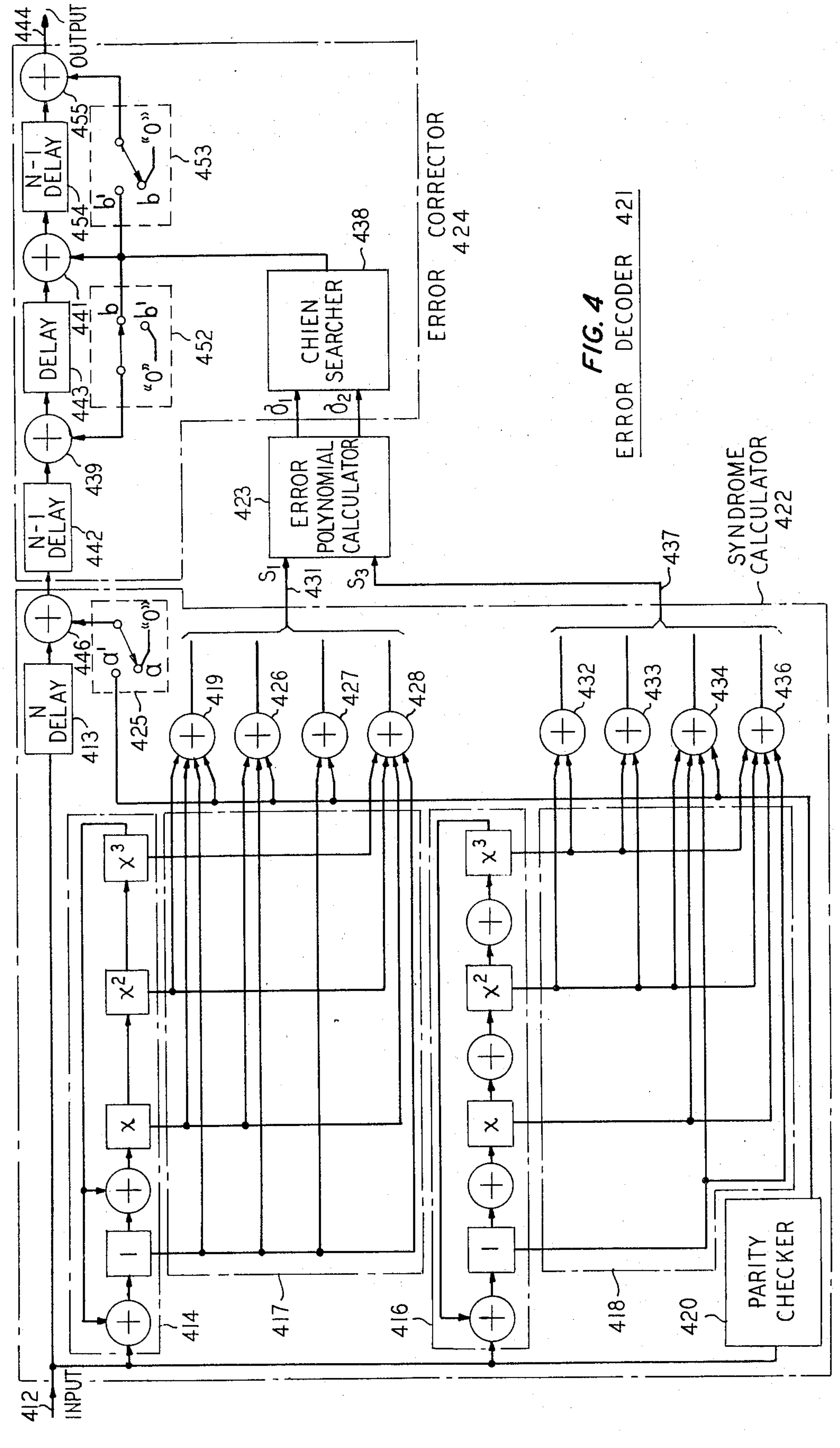
FIG. 4 is an alternative error decoder which can be used in FIG. 1.

This procedure is implemented by the error decoder circuit 421 of FIG. 4.

FIG. 1 is a block diagram of a typical transmission system 111 embodying the principles of the present invention. An analog input signal from input source 112 is sampled and encoded by an encoder 113. Input source 112 may represent, for example, a source of audio or video signals. The encoded signal is applied to a parity generator 114 which adds parity bits to allow correction of errors in each block of digital data. The output of the parity generator 114 is applied to a scrambler 116 which converts the digital data and parity bits into a random sequence of pulses suitable for transmission over a channel 117. The scrambler 116 may be one of the numerous self-synchronizing scramblers known to those skilled in the art. The electrical equivalent of the channel 117, in this case, is a noise added modulo 2 to the transmission signal by an adder 118. The received signal from the channel 117 is applied to a descrambler 119. The output of the descrambler 119 is the same as the input signal to the scrambler 116 for each block of information as long as no noise was added to the transmitted signal. In other words, the received signal is free of errors. However, any error signals introduced in the channel 117 will enter the descrambler 119. These errors are multiplied by the descrambler 119 into an error pattern. The exact pattern of the error multiplication is dependent upon the structure of the descrambler 119 and the proximity of the errors to each other. For each channel error, the error pattern is dependent upon the structure of the descrambler 119; but if two channel errors occur within a few bits the error patterns overlap and are altered accordingly. The descrambled signal is applied to an error decoder 121 which comprises a syndrome calculator 122, an error polynomial calculator 123, and an error corrector 124. The operation of the error decoder 121 of FIG. 1 will become apparent from the following discussion of the schematic diagrams shown in FIGS. 3 and 4. The output signal of the error decoder 121 is applied to a decoder 126 which reconstructs the analog signal from the encoded data and applies the signal to a utilization circuit 127.

Figures 2A, 2B, 2C:
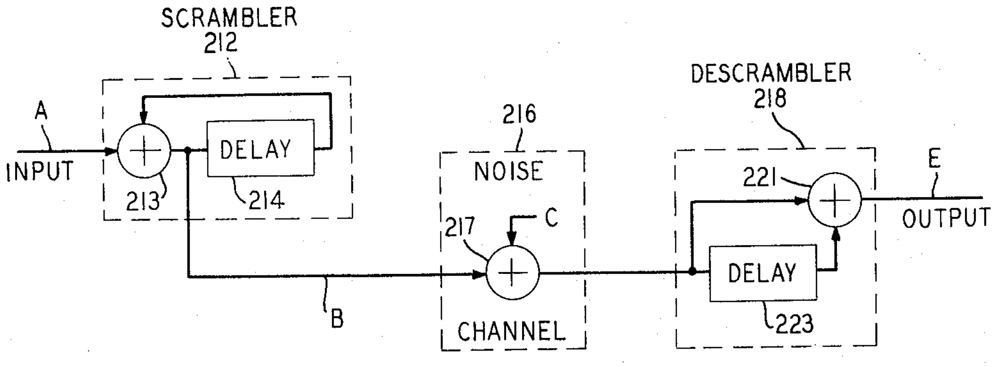
FIG. 2A is a scrambler-descrambler arrangement which can be utilized in FIG. 1.
FIG. 2B is a chart of the input and output sequences without any channel errors for the arrangement depicted in FIG. 2A.
FIG. 2C is a chart of the input and output sequences with channel errors for the arrangement depicted in FIG. 2A.

FIG. 2 is a conventional arrangement of a scrambler circuit 211. The scrambler circuit 211 comprises a scrambler 212 connected via a transmission channel 216 to a descrambler 218. The output signal of the parity generator 114 is applied to input terminal A of the scramber 212, which comprises a modulo 2 adder 213 and a delay 214 with a delay interval that corresponds to one bit or time slot. The scrambler 212 is commonly known to those skilled in the art as a one cell scrambler. A conductor B supplies the output signal of the scrambler 212 to the transmission channel 216. For the purpose of the present invention, the transmission channel 216 may be represented by a noise signal applied to a terminal C of a modulo 2 adder 217. A conductor D supplies the output signal from the transmission channel 217 to the descrambler 218. The descrambler 218 comprises a modulo 2 adder 221 and a delay 223 with the same delay interval as the delay 214. The output signal of the descrambler 218 is applied to the syndrome calculator 122 of the error decoder 121 in FIG. 1. To facilitate a discussion of the operation of the scrambler circuit 211, FIGS. 2B and 2C each illustrate one input and output sequence for the scrambler circuit 211. FIG. 2B illustrates an input and output sequence in which the transmission channel 216 does not introduce any errors. FIG. 2C illustrates an input and output sequence in which the transmission channel 216 introduces two errors that are multiplied to produce two double error patterns. For the following discussion, it should be assemed initially that a 0 is stored in the delay 214 and another 0 is stored in the delay 223. The length of the code blocks is 9 bits.

In FIG. 2B, column A represents an input sequence for transmission. Column B represents the scrambled output signal of the scrambler 212, which is obtained by the modulo 2 addition of each bit of information to the next bit of information. This is provided by the operation of the delay 214 and the modulo 2 adder 213. Column D represents the output signal from the transmission channel 216. Column D is produced by the addition of columns B and C by the modulo 2 adder 217. Column D is the same as column B since, in this case, column C represents no errors. Column E represents the output of the descrambler 218 which is obtained by the addition of each bit of information to the next bit of information. In modulo 2 addition, the addition of two 1s produces a 0. Thus, the operation of the modulo 2 adder 221 and the delay 223 add a 1 to the scrambled signal to recover the original signal in the same time slot as a 1 was added to the input signal to produce the scrambled signal. Therefore, column A is identical to column E and column F which was obtained by subtracting column A from column E which represents all 0s or no errors.

FIG. 2C illustrates the error multiplication of the channel errors by the descrambler 218. Column A of FIG. 2C represents the same input sequence as column A in FIG. 2B. This makes column B of FIG. 2C identical to column B of FIG. 2B. Column C, however, represents an error signal with two errors introduced by the transmission channel 216. Correspondingly, column D is altered by the error signal of column C. The descrambler 218 attempts to recover the signal represented by A, but each channel error produces one error in its time slot and an error in the next time slot. This can be seen more clearly by column F which is obtained by the subtraction of column A from column E. Thus, the one cell scrambler produces an error pattern of two bits for each random error which is introduced by the transmission channel 216.

FIG. 3 is a schematic diagram of an error decoder 321 which is suitable for use as the error decoder 121 of FIG. 1. The error decoder 321 comprises a syndrome calculator 322 which is enclosed by dashed lines, an error polynomial calculator 323 shown in block form, and an error corrector 324 which is enclosed by dashed lines. The output sequence of the descrambled signal from the descrambler 119 of FIG. 1 is applied to an input terminal 312. The input signal from the terminal 312 is applied to a delay 313, a shift register 314, and a shift register 316. The delay 313 retards the input signal for an interval N that allows the remaining circuitry in the syndrome calculator 322 to produce output signals at terminals 331 and 337 which can be processed by the error polynomial calculator 323 and corrected by the error corrector 324. The signal designated $S_1$ at the output terminal 331 is produced by applying the input signal to the shift register 314 which is connected to a connection matrix 317. Modulo 2 adders 319, 326, 327, and 328, combine the signals stored in the shift register 314 by the cells labeled 1, X, $X^2$, and $X^3$. Simultaneously, the signal designated $S_3$ at the output terminal 337 is produced by the application of the input signal to the shift register 316, which is connected to the connection matrix 318. Modulo 2 adders 332, 333, 334, and 336 combine the signals stored in the shift register 316 by the cells designated 1, X, $X^2$, and $X^3$. For the sake of simplicity, it is to be understood that a synchronization circuit not shown in FIG. 3 clears all the cells in shift registers 314 and 316 before the beginning of each block of information.

The connection of the feedback path of the shift register 314 is indicative of the polynomial $x^4 + x + 1$. The operation of the shift register is equivalent to dividing the output polynomial of the descrambler 119 of FIG. 1 by the polynomial $x^4 + x + 1$. The residue left in the cells of the shift register 314 at the end of each block of information is the remainder $r_1(x)$. The combination of the connection matrix 317 and modulo 2 adders 319, 326, 327, and 328 perform an operation which is equivalent to multiplying $r_1(x)$ by $C_1$.

The connection of the feedback path of the shift register 316 is represented by the polynomial $x^4 + x^3 + x^2 + x + 1$. The operation of the shift register is equivalent to dividing the output polynomial of the descrambler 119 of FIG. 1 by the polynomial $x^4 + x^3 + x^2 + x + 1$. The residue left in the cells of the shift register 316 at the end of each block of information is the remainder $r_3(x)$. The combination of the connection matrix 318 and modulo 2 adders 332, 333, 334, and 336 perform an operation which is equivalent to multiplying $r_3(x)$ by $C_3$.

The combination of $S_1$ and $S_3$ is known as the syndrome. Actually, $S_1$ and $S_3$ are components of the syndrome. For each block of information which is free of errors, $S_1$ and $S_3$, or the syndrome, has a value of zero. If an error is present in a block of information, the syndrome is not zero, and it contains information which will be used by the error polynomial calculator 323 and the error corrector 324. The syndrome represented by signals $S_1$ and $S_3$ is the same syndrome which would be produced by a conventional syndrome calculator that operates upon the original (unscrambled) BCH code with the occurrence of random errors corresponding to the positions of the errors introduced by the channel 117 of FIG. 1. In other words, the syndrome produced by the present invention is not altered by the effect of error multiplication of the descrambler 119 of FIG. 1. This characteristic of the syndrome enables it to be processed by a conventional error calculator and a Chien searcher. Thus, the error polynomial calculator 323 and a Chien searcher 338 may be of the type shown in FIG. 5.14 on page 136 of the Berlekamp text. The output of the Chien searcher is applied to modulo 2 adders 339 and 341. The delay 342 retards the signal from the delay 313 for an interval N-1. The delays 342 and 343 allow the error polynomial calculator 323 sufficient time to find the elementary symmetric functions $\sigma_1$ and $\sigma_2$ of the error locations from the syndrome components $S_1$ and $S_3$ which are power sum symmetric functions of the error locations. As soon as $\sigma_1$ and $\sigma_2$ are applied to the Chien searcher 338, the error correcting sequence is initiated. The output signal of the Chien searcher 338 is applied to modulo 2 adders 339 and 341 which are displaced in time by the interval of a delay 343. For the case of the one-cell scrambler, input and output signals of the delay 343 are two adjacent bits in the sequence of the input signal. Thus, a single output signal of the Chien searcher 338 is applied to two adjacent bits which correspond to the error pattern produced by the one-cell scrambler. An equivalent operation can be performed by a descrambler, such as the descrambler 218, and the modulo 2 adder 341. In this case, the modulo 2 adder 339 and the delay 343 would be the components of the descrambler 218. The corrected signal from an output terminal 344 is applied to the decoder 126 of FIG. 1. The decoder 126 reconstructs the analog input signal from the input source 112 of FIG. 1 from its digital input signal.

Before a discussion of the operation of the circuit shown in FIG. 3, some basic principles of coding theory will be set forth. The (15,7) BCH code for the present invention has a block or code word which contains fifteen bits. Each block of fifteen bits contains seven information bits followed by eight parity bits. The parity bits are derived from the information bits. The information bits and parity bits in each code word are checked against each other to correct errors. For this reason, the output of shift registers 314 and 316 is not used to calculate the syndrome $S_1$ and $S_3$ until the entire code word has been processed by these shift registers. This (15,7) BCH code has inherent information in it which can be used to correct two random errors in each code block.

The following is a discussion of the operation of the circuit depicted in FIG. 3. For the purpose of a simple illustration, it should be assumed that a code word consisting of 15 0s is transmitted. The transmission channel 117 of FIG. 1 introduces errors, or inversions, in the fourth and eleventh time slots. A one cell scrambler connected in the position of the descrambler 119 of FIG. 1 produces error multiplication such that a first double error pattern occupies the fourth and fifth time slots and a second double error pattern occupies the eleventh and twelfth time slots of the code word applied to the error decoder 121 of FIG. 1. This is represented by the pattern of 000110000011000 with the number of the time slots increasing from left to right in time. The 1 output states of the cells of shift registers 314 and 316 will be given as the input code word enters these shift registers. The output states of the cells of shift registers 314 and 316 are applied respectively to connection matrices 317 and 318. Up until the fourth time slot, that is 000$\underline{1}$, the cells of shift registers 314 and 316 produce an output of all 0s. As the 5th time slot of the signal is applied to shift registers 314 and 316, that is 0001$\underline{1}$, the only cells which produce a 1 output are the cells labeled 1 in shift registers 314 and 316. When the 6th time slot of the signal is applied to these shift registers, that is 000110, the cells labeled 1 and X of shift registers 314 and 316 produce an output of 1. For the application of the 7th time slot, that is 0001100, the cells labeled X and $X^2$ produce an output of 1. For the input signal of 00011000, or the 8th time slot, the cells of shift register 314 and 316 labeled $X^2$ and $X^3$ produce an output of 1. During the 9th time slot, that is 000110000, an output of 1 is produced by the cells labeled 1, X, $X^3$ and by the cells labeled 1, X, $X^2$ of respective shift registers 314 and 316. An output of 1 is produced for the signal of 0001100000, or the 10th time slot, by the cells labeled 1 and $X^2$ of the shift register 314 and 316 and by the cells labeled X, $X^2$ and $X^3$ of the shift register 316. For the 11th time slot, or an input signal of 00011000001, the cells labeled X and $X^3$ produce a 1 output for shift register 314 while the cells labeled 1 and X produce a 1 output for the shift register 316. At the 12th time slot, that is 000110000011, a 1 is produced by the cells labeled X and $X^2$ of the shift register 314 and the cells labeled 1, X, $X^2$ of the shift register 316. For the signal of 0001100000110, or the thirteenth time slot, the cells labeled 1, $X^2$ and $X^3$ of the shift register 314 and all of the cells of the shift register 316 produce a 1 output. At the time corresponding to the 14th time slot, or 00011000001100, the cells labeled 1 and $X^3$ of the shift register 314 and the cell labeled 1 of the shift register 316 produce an output of 1. For the sequence of the 15th time slot, or 000110000011000, the cell labeled 1 and the cell labeled X of shift registers 314 and 316, respectively, produce a 1 output. At the end of the input sequence, the cell labeled X of the shift register 314 and the cell labeled $X^2$ of the shift register 316 produce an output of 1. Thus, the residue of the shift register 314 is 0100 designated $r_1(x)$ while the residue of the shift register 316 is 0010 designated $r_3(x)$. It should be understood that no generality is lost by use of 15 0s for the transmitted code word, since any code word or block which contains the error patterns of this example will produce the same values for $r_1(x)$ and $r_3(x)$. In other words, the values 0100 for $r_1(x)$ and 0010 for $r_3(x)$ are the only possible values for the error patterns of this example and these values are not changed by the specific bit pattern of the code word.

Connection matrices 317 and 318 perform a linear transformation upon $r_1(x)$ and $r_3(x)$. The residue or remainder $r_1(x)$ of the shift register 317 is applied to the connection matrix 317 while the remainder $r_3(x)$ of the shift register 316 is applied to the connection matrix 318. As explained in the mathematical derivation, the matrix 317 (in column reversed form) is represented by $$C_1^{(cr)}=\begin{bmatrix}0&1&1&1\\0&0&1&1\\0&0&0&1\\1&1&1&1\end{bmatrix}.$$

and the matrix 318 is represented by $$C_3^{(cr)}=\begin{bmatrix}1&0&1&0\\1&1&0&0\\0&1&1&1\\1&1&1&1\end{bmatrix}.$$

The syndrome component $S_1$ is obtained by the produce of $C_1^{(cr)}$ and $r_1(x)$. Likewise, $S_3$ is obtained by the product of $C_3^{(cr)}$ and $r_3(x)$. Therefore, the matrices multiplication are:

$$S_1=C_1r_1(x)=\begin{bmatrix}0&1&1&1\\0&0&1&1\\0&0&0&1\\1&1&1&1\end{bmatrix}\begin{bmatrix}0\\0\\1\\0\end{bmatrix}=\begin{bmatrix}1\\1\\0\\1\end{bmatrix},\text{ and}$$

$$S_3=C_3r_3(x)=\begin{bmatrix}1&0&1&0\\1&1&0&0\\0&1&1&1\\1&1&1&1\end{bmatrix}\begin{bmatrix}0\\1\\0\\0\end{bmatrix}=\begin{bmatrix}0\\1\\1\\1\end{bmatrix}.$$

From the tables in FIG. 5, 1101 or $S_1$ is equivalent to the primitive element $\alpha$ raised to the 13th power ($\alpha^{13}$), and $S_3$ or 0111 is equivalent to the primitive element $\alpha$ raised to the 10th power ($\alpha^{10}$).

The error calculator 323 processes the syndrome $S_1$ and $S_3$ from the matrices 317 and 318 to obtain $\sigma_1$ and $\sigma_2$; in this case, $$\sigma_1=S_1=\begin{bmatrix}1\\1\\0\\1\end{bmatrix}=\alpha^{13},\text{ and}$$

$$\sigma_2=S_1^2+\frac{S_3}{S_1}=\begin{bmatrix}1\\1\\1\\0\end{bmatrix}+\begin{bmatrix}1\\1\\1\\1\end{bmatrix}=\begin{bmatrix}0\\0\\0\\1\end{bmatrix}=\alpha^0=1.$$

The values of $\alpha$ are obtained from the tables in FIG. 5.

The Chien searcher 338 uses $\sigma_1$ and $\sigma_2$ in the polynomial $1+\sigma_1x+\sigma_2x^2$. The Chien searcher 338 clocks through the following sequence 15times:

| | | | |
|---|---|---|---|
| Initially | $\sigma_1+$ | $\sigma_2+$ | 1 |
| 1. | $\sigma_1\alpha+$ | $\sigma_2\alpha^2+$ | 1 |
| 2. | $\sigma_1\alpha^2+$ | $\sigma_2\alpha^4+$ | 1 |
| . | . | . | . |
| . | . | . | . |
| . | . | . | . |
| 15. | $\sigma_1\alpha^{15}+$ | $\sigma_2\alpha^{30}+$ | 1 |

For this example, the following table of binary numbers is generated.

| | $\sigma_1\alpha$ | $\sigma_2\alpha^2$ | 1 | Output |
|---|---|---|---|---|
| Initially | 1101 | 0001 | 0001 | |
| 1. | 1001 | 0100 | 0001 | 0 |
| 2. | 0001 | 0011 | 0001 | 0 |
| 3. | 0010 | 1100 | 0001 | 0 |
| 4. | 0100 | 0101 | 0001 | 1 |
| 5. | 1000 | 0111 | 0001 | 0 |
| 6. | 0011 | 1111 | 0001 | 0 |
| 7. | 0110 | 1001 | 0001 | 0 |
| 8. | 1100 | 0010 | 0001 | 0 |
| 9. | 1011 | 1000 | 0001 | 0 |
| 10. | 0101 | 0110 | 0001 | 0 |
| 11. | 1010 | 1011 | 0001 | 1 |
| 12. | 0111 | 1010 | 0001 | 0 |
| 13. | 1110 | 1110 | 0001 | 0 |
| 14. | 1111 | 1101 | 0001 | 0 |
| 15. | 1101 | 0001 | 0001 | 0 |

The output of the Chien searcher 338 is produced by the modulo 2 addition of component by component of the vectors $\sigma_1\sigma^i$, $\sigma_2\sigma^{2i}$, and 1, and the resultant vector components are applied to a "NOR" gate. The last column is the output of the "NOR" gate. As is evident, the Chien searcher 338 produces a 1 output for the fourth and 11th time slots of the code word applied to shift registers 314 and 316. The output of the Chien searcher 338 is applied to modulo 2 adders 339 and 341. Due to the one bit interval of the delay 343, the first 1 output of the Chien searcher 338 which combines the 1 error in the fourth time slot of the code word 0001 to cancel the 1 in error also eliminates the 1 error in the fifth time slot. Similarly, the 1 output of the Chien searcher 338 during the eleventh time slot eliminates the double error pattern of 1s in the eleventh and twelfth time slots of the erroneous code word. As a result, the output signal of the modulo 2 adder 344 at the terminal 344 is 000000000000000. This output is identical to the origninally transmitted code word of fifteen 0s.

FIG. 4 is a schematic diagram of an error decoder 421 which also can be used as the error decoder 121 of FIG. 1. Basically, the error decoder 421 performs the same function as the error decoder 321 of FIG. 3, but it also has the capability of correcting error overlap patterns which bridge two adjacent code blocks. In other words, if a random error occurs in the last time slot of a scrambled code block, a one-cell descrambler in place of the descrambler 119 of FIG. 1 or the descrambler 218 of FIG. 2A produces an error pattern of two bits with the first bit occurring in the descrambled code block recovered from the scrambled code block which contains the random error and the second bit occurring in the next successive descrambled code block. As was pointed out in the mathematical discussion before discussion of FIG. 1, the combination of a code block with a long block length and a one-cell scrambler greatly reduces the probability of this situation. However, it may be desirable, in some circumstances, to use a short code block with the additional feature of the error decoder 421 to correct error overlap patterns that bridge two successive code blocks. This will be necessary to ensure accurate error decoding.

FIG. 4 comprises shift registers 414 and 416 and connection matrices 417 and 418 which are connected, respectively, to modulo 2 adders 419, 426, 427 and 428 and to modulo 2 adders 432, 433, 434 and 436. The components in FIG. 4 with the last two digits of the 3-digit reference numerals that are the same as the last two digits of the reference numerals for the respective components in FIG. 3 are identical in structure and function except for certain modulo 2 adders in FIG. 4. Specifically, these are modulo 2 adders 419, 426, 427 and 434 which have inputs connected to the output of a parity checker 420. The error decoder 421 operates in the same manner as the error decoder 321 of FIG. 3 except when an error pattern bridges between two successive code blocks. The parity checker 420 performs an overall parity check on each descrambled code block from the output of the descrambler 119 of FIG. 1. BCH codes have been devised which contain only an even number of bits in each code block. For these codes, the only error patterns produced by a one-cell scrambler which will change the overall parity of the code blocks are those that bridge between adjacent code blocks. If a bridging error pattern occurs, the parity checker 420 produces an output of 1. Before the error calculator 423 begins to operate on the syndrome $S_1$ and $S_3$, a switch 425 momentarily changes position from a to $\underline{a}'$. This causes a 1 to be added by a modulo 2 adder 446 to the first time slot of the descrambled code block coming from the delay 413. The operation of switch 425 and switches 452 and 453, the transfer of $S_1$ and $S_3$ to the error corrector 423, the transfer of $\sigma_1$ and $\sigma_2$ into the Chien searcher 438, and the clearing of shift registers 414, 416 and 420 are all under the control of a synchronization circuit not shown for the sake of simplicity. Simultaneously with the position change of the switch 425, the syndrome $S_1$ and $S_2$ is altered. This is done by application of the 1 output of parity checker 420 to modulo 2 adders 419, 426, 427 and 434. Mathematically, the term $[1/f'(\alpha)]\alpha^{n-1}$ is added to $S_1$ and the term $[1/f'(\alpha^3)]\alpha^{3(n-1)}$ is added to $S_3$. In terms of the actual signal in the error decoder 422, the first bit is corrected and the part of the syndrome $S_1$ and $S_2$ which contains information for the single error is reduced to zero. If this is the only error in the code block, that error is corrected and the entire syndrome $S_1$ and $S_3$ is reduced to zero.

If the bridging error pattern occurs in the last bit of the descrambled code block, the operation of the error decoder 422 is slightly different. Again, the parity checker 420 produces a 1 output and the first bit is inverted. Then the error pattern for correction is 100000000000001. The error calculator 423 and the Chien searcher 438 produce an output signal to correct the error pattern. However, switches 452 and 453 change position momentarily from $\underline{b}$ to $b'$ during the last time slot of the descrambled code block. The output of the switch 453 is applied to a modulo 2 adder 455 and a modulo 2 adder 441. Since these adders are separated by the interval N-1 of a delay 454 and the correction signal from the Chien searcher is a 1 output in the last time slot, the correction pattern for the descrambled code block is 100000000000001.

If a double briding error pattern occurs between the previous and following code blocks, the descrambled error pattern 100000000000001 is produced. In this case, the parity checker 420 will not produce a 1 output during the overall parity check of the descrambled code block. When the switch 425 is switched momentarily from position $\underline{a}$ to $a'$, $a$ ' 0 is added to the first time slot. This does not change the descrambled code block. The error calculator 423 and the Chien searcher 438 operate in the same manner as when the error pattern 100000000000001 was produced by the inversion of the first bit. Thus, the Chien searcher 438 produces a 1 output for the last time slot. Again, the switches 452 and 453 change from $\underline{b}$ to $b'$ during the last time slot, and the double briding error pattern is corrected. Since this completes all the possible error patterns occurring in the descrambled code block, the error decoder 421 will correct any possible error pattern caused by two errors in the scrambled signal.

In all cases it is to be understood that the foregoing described method is not limited to the disclosed embodiments which represent a small number of the many possible applications of the principles of the invention. For example, the disclosed method may be used in embodiments designed to include more complex scrambler-descrambler arrangements which generate more complex error patterns. Numerous and varied other modifications of digital communication systems such as telemetering systems, facsimile systems and data processing systems in accordance with these principles may readily be devised by those skilled in the art without departing from the spirit and scope of the invention.

What is claimed is:

1. In a data transmission system in which information sequences are encoded in a BCH code which can correct $t$ errors, where $t$ is an integer, said code being generated by means of a polynomial whose roots are $\alpha^i$ where $i = 1, 3, \ldots 2t-1$, scrambled for transmission through a digital channel, and descrambled after transmission to recover said code, a method of correcting errors introduced by said channel which are changed into multiple error patterns by said descrambler comprising the steps of:

generating electrical signals representing remainder polynomial $$r_i(x) = \sum_{j=0}^{m-1} r_{ij}$$

from the received descrambled sequence;

generating matrices $F_i$ of the linear transform obtained from the roots $\alpha^i$ and the polynomial representing the error patterns;

multiplying $C_i{}'^{(cr)}$ matrices by $F_i$ matrices to produce connection matrices $C_i{}^{(cr)}$ where the $C_i{}'^{(cr)}$ are matrices for the unscrambled BCH code;

multiplying the vector of the coefficients in the remainder polynomials $$r_i(x) = \sum_{j=0}^{m-1} r_{ji}x^j$$

by the matrices $C_i^{(cr)}$ to obtain the power sum symmetric functions $S_1, S_3 \ldots S_{2t-1}$ of the error locations;

generating an error polynomial from the electrical representations of the power sum symmetric functions $S_1, S_3 \ldots S_{2t-1}$;

extracting the roots of the error polynomial to obtain correction signals for the error locations introduced by said channel;

combining the correction signals and the descrambled signal at locations of the errors in the descrambled signal to produce an output signal free of errors.

2. In a system for decoding code words of a double-error-correcting BCH code including random errors which have been unavoidably multiplied into randomly occurring predetermined error patterns, apparatus comprising:

first means for successively dividing the code words by the polynomial $g_1(x) = x^4 + x + l$ to obtain a first remainder $r_1(x)$ indicative of the predetermined error patterns;

second means for successively dividing the code words by the polynomial $g_3(x) = x^4 + x^3 + x^2 + x + 1$ to obtain a second remainder $r_3(x)$ indicative of the predetermined error patterns;

third means for linearly transforming $r_1(x)$ into a first syndrome component $S_1$ that contains information for locating each random error that caused each predetermined error pattern;

fourth means for linearly transforming $r_3(x)$ into a second syndrome component $S_3$ that contains information for locating each random error that caused each predetermined error pattern;

fifth means for generating correction signals from the syndrome components $S_1$ and $S_3$;

and sixth means for combining each correction signal from the output of said fifth means with the code words at a plurality of error locations corresponding to each predetermined error pattern to produce an output signal from said sixth means free of errors.

3. The apparatus of claim 2 wherein said sixth means for combining comprises first and second adding means each having one input terminal connected to output of said fifth means, delaying means connected from the output terminal of said first adding means to the other input terminal of said second adding means, the other input terminal of said first adding means being connected to receive the code words, and said first and second adding means combining the correction signals and the code words to eliminate the error patterns from the output of said second adding means.

4. The apparatus of claim 2 further comprising:

means for checking the parity of each code word to determine the overall parity weight of each code word, means for inverting the first information bit of each code word when the output of said parity checking means indicates odd parity weight, means for modifying the $S_1$ and $S_3$ output signals of said third and fourth means when the output of said means for checking parity indicates odd parity weight, and said means for modifying cancelling that portion of $S_1$ and $S_3$ signals indicative of the first information bit before inversion.

5. The apparatus of claim 4 wherein said sixth means comprise first, second and third adding means each having two input terminals and an output terminal;

first delaying means connected from the output terminal of said first adding means to an input terminal of said second adding means, second delaying means connected from the output terminal of said second adding means to the input terminal of said third adding means, switching means connected from the output of said fifth means to an input terminal of said first and third adding means, said second adding means having an input terminal connected to the output of said fifth means, and said switching means completing the signal path from either said fifth means to said first adding means or said third adding means, the signal path from said fifth means to said third adding means being completed when the last information bit in the code word is passing through said second adding means.

6. The apparatus of claim 3 wherein said delaying means has an interval such that when one information bit in the code word is passing through said second adding means the next successive information bit is passing through said first adding means.

7. The apparatus of claim 5 wherein said first delaying means has a delay interval substantially equal to the time interval between successive information bits in the code word, and said second delaying means has a delay interval substantially equal to the time interval between the first and last information bits in the code word.

* * * * *